United States Patent [19]
Sakata et al.

[11] Patent Number: 5,319,581
[45] Date of Patent: Jun. 7, 1994

[54] DATA PROCESSOR WITH CLOCKING FOR VARIOUS WORLD TIMES

[75] Inventors: Mitsuhiro Sakata; Taizou Nishida, both of Ikoma, Japan

[73] Assignee: Sharp Kabushiki Kaisha, Osaka, Japan

[21] Appl. No.: 928,409

[22] Filed: Aug. 12, 1992

[30] Foreign Application Priority Data

Aug. 29, 1991 [JP] Japan ................................. 3-218950

[51] Int. Cl.⁵ ............................................. G06F 15/16
[52] U.S. Cl. ................................................ 364/705.07
[58] Field of Search ...................... 364/705.01, 705.06, 364/705.07; 368/21, 22, 23, 24

[56] References Cited

U.S. PATENT DOCUMENTS

| | | | |
|---|---|---|---|
| 3,940,920 | 3/1976 | Nakamura et al. | 368/21 |
| 4,681,460 | 7/1987 | Nishimura | 368/21 |
| 4,779,247 | 10/1988 | Uchida | 368/22 |
| 4,884,254 | 11/1989 | Kawai et al. | 368/21 |
| 5,007,033 | 4/1991 | Kubota et al. | 368/21 |

FOREIGN PATENT DOCUMENTS 55-78292 6/1980 Japan .
61-247994 11/1986 Japan .
1-307690 12/1989 Japan .

Primary Examiner—Long T. Nguyen
Assistant Examiner—Choung D. Ngo
Attorney, Agent, or Firm—Nixon & Vanderhye

[57] ABSTRACT

A data world times clocking includes a main clock for clocking a reference time and prestorage memory for prestoring names of cities in various time zones in the world and a time difference between the reference time and a standard time for each of the various cities. An input device permits an operator to specify a time difference and a name of a city other than the names of various cities prestored in the prestorage part. Upon such specification of the time difference, a readout device calculates a standard time based on the time difference and reads out the calculated standard time and one of the prestored names of cities which exist in the same time zone. Upon entry of the name of a city other than the names of various cities prestored in the prestorage means, the read-out name of a city is replaced with the name of a city entered through the input device. A display displays the replaced city name and the calculated standard time.

10 Claims, 5 Drawing Sheets

FIG. 6
(a)
(PRIOR ART)

```
PARIS
1992-12-25
  12:31  00
```

↓ REPLACE

FIG. 6
(b)
(PRIOR ART)

```
PARIS
1992-12-25
  12:31  00
```

ROM DATA

```
1 PARIS
2 ROME
3 BONN
```

↓ CALL  (DESIGNATE 2)

FIG. 6
(c)
(PRIOR ART)

```
ROME
1992-12-25
  12:31  00
```

↓ CALL  (DESIGNATE 3)

FIG. 6
(d)
(PRIOR ART)

```
BONN
1992-12-25
  12:31  00
```

INPUT

DATA PROCESSOR WITH CLOCKING FOR VARIOUS WORLD TIMES

FIELD OF THE INVENTION

The present invention relates to a data processor with clocking for various world times for displaying names of various cities in the world and standard times for the respective cities.

DESCRIPTION OF THE RELATED ART

In a conventional data processor a city name among many stored in a ROM is called and set to combine with a corresponding standard time.

FIGS. 6(a)-6(d) show an example of display of an electronic memorandum device which includes such a data processor. If the city name being displayed is to be replaced, it cannot be replaced freely because only the city names stored in a ROM can be called and displayed by means of a calling key (or a numeric key). Since the cities appearing in this figure belong to the same clocking or time zone, i.e. a zone using the same standard time, the displayed time is not altered. In addition it is indicated that the city names in inversion display can be replaced.

In the conventional data processor, only the city names stored as data in the ROM are called and set to combine with the corresponding standard times for world times clocking. Consequently it is impossible to apply world times clocking to the cities other than those stored in the ROM.

By way of the related art to the present invention, a world clock is disclosed in Japanese Unexamined Patent Publication No. 307690/1989. A standard time for a certain area in the world the country said area belongs to or the time difference between said standard time and a standard time for another designated area can be displayed simultaneously. A multialarm world clock is disclosed in Japanese Unexamined Patent Publication No. 247994/1986. A plurality of alarm times can be stored and region data can be set for each alarm. A world clock with alarm is also disclosed in Japanese Unexamined Patent Publication No. 78292/1980. Alarm times and the names of cities can simultaneously be set so that an alarm can be operated on any alarm times set for various regions in the world irrespective of the city and time being displayed.

SUMMARY OF THE INVENTION

It is an object of the invention to provide a data processor with world times clocking wherein the name of a city being displayed with the corresponding standard time for world times clocking can be replaced with the name of any other city in the same clocking zone by entering the same, thereby enabling world times clocking for any desired city in the world.

Thus, the present invention provides a data processor with world times clocking comprising: clocking means for clocking a standard time for any city in the world; prestorage means for prestoring names of various cities in the world and a time difference between the standard time clocked by the clocking means and a standard time for each of the various cites; input means for specifying the time difference and for entering a name of a city other than the names of various cities prestored in the prestorage means; readout means, upon specification of the time difference, for calculating a standard time on the basis of the time difference and for reading out the calculated standard time and any of the prestored names of cities which exist in the same clocking zone using the calculated standard time; city name storage means for storing the read-out name of a city; time storage means for storing the calculated standard time which is read out; replacing means, upon entry of the name of a city other than the names of various cities prestored in the prestorage means through the input means, for replacing the read-out name of a city with the name of a city entered through the input means; and display means for displaying the replacing name of a city and the calculated standard time stored in the time storage means.

Preferably, the entry of the name of a city is carried out by displaying one of the prestored names of various cities, indicating with a cursor that the displayed name of city is replaceable, and replacing the same with the name of a city entered through the input means.

Also preferably, the display means simultaneously displays the name of any city in the world, a code representing a time difference between the standard time for the city of that name and the standard time clocked by the clocking means, and the date and standard time for the city of that name.

According to the present invention, it is possible to read out a city name from the prestorage means, store the same in the city name storage means, and replace the same with a desired city name entered from the input means. Accordingly, if the name of a city is replaced with that of any city belonging to the same clocking zone, it is possible to see standard times for other zones on the basis of the standard time for the city of the replacing name.

BRIEF DESCRIPTION OF THE DRAWINGS

FIGS. 6(a)-6(b) are a schematic representation showing an example of display according to a prior art electronic memorandum device.

DETAILED DESCRIPTION OF THE PREFERRED EMBODIMENTS

A preferred embodiment of the invention will be described in detail with reference to the drawings. It should be understood that the invention should not be limited to the following embodiment.

Figure 1:
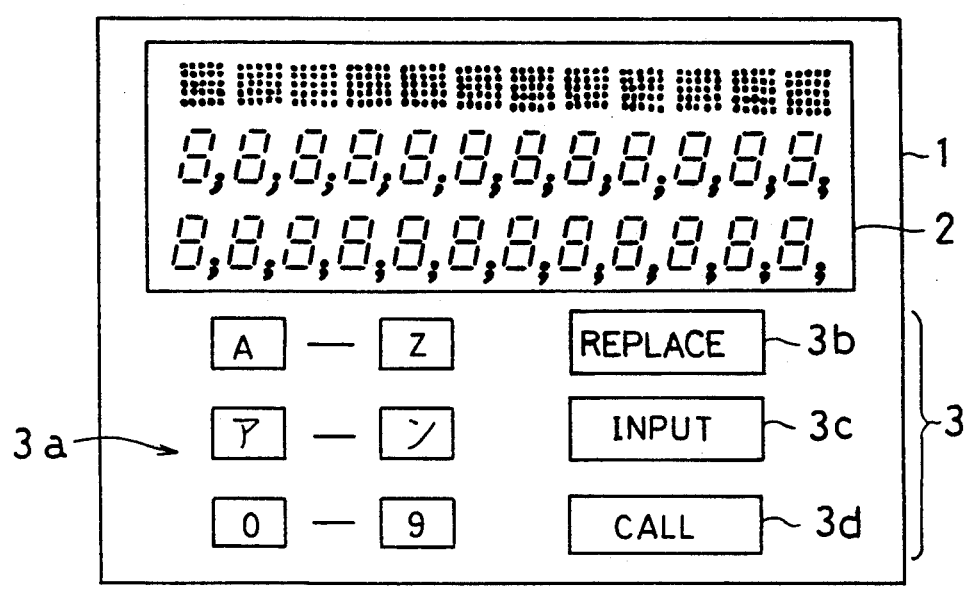
FIG. 1 is a schematic representation showing a display part of an electronic memorandum device according to an embodiment of the present invention.

Referring to FIG. 1, an electronic memorandum device 1 comprises a display 2 and a key input 3. The key input 3 includes character keys 3a for entering a city name, a replace key 3b for changing the mode into a replace mode, an input key 3c for causing the entered city name to be stored in memory, and a calling key 3d for calling a prestored city name and the corresponding standard time.

Figure 2:
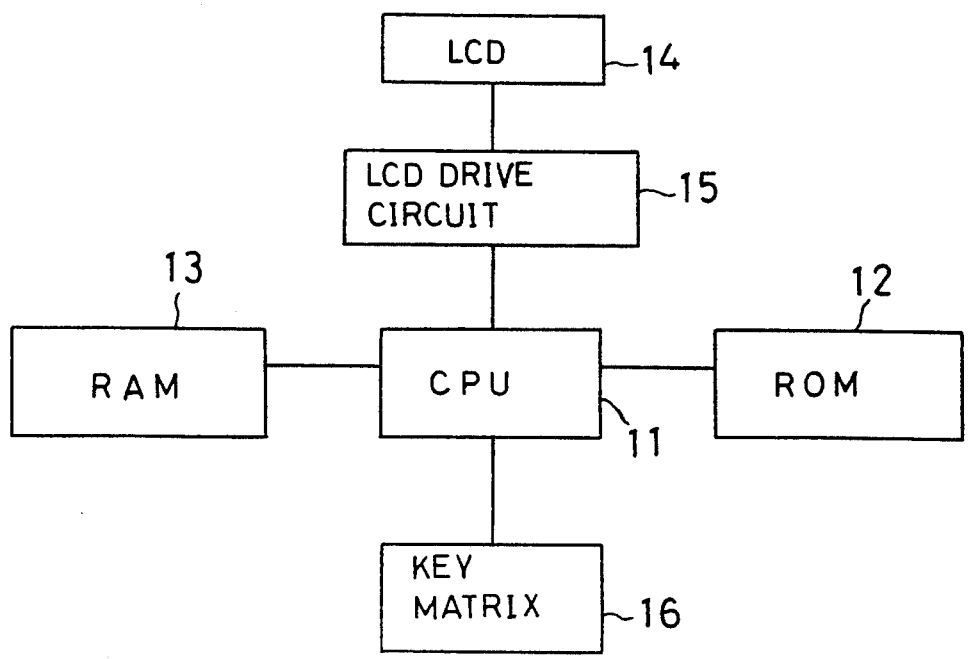
FIG. 2 is a block diagram showing the configuration of the electronic memorandum device.

Referring to FIG. 2, the configuration of the electronic memorandum device 1 incorporates a CPU 11 for controlling the device 1, a ROM 12 for storing programs and constants for operating the CPU 11, a RAM 13 for storing numeric values and for controlling the device 1, a LCD (liquid crystal display) 14 forming the display 2, a LCD drive circuit 15 for driving the LCD 14, and a KEY matrix for detecting a key entry from the key input 3.

Figure 3:
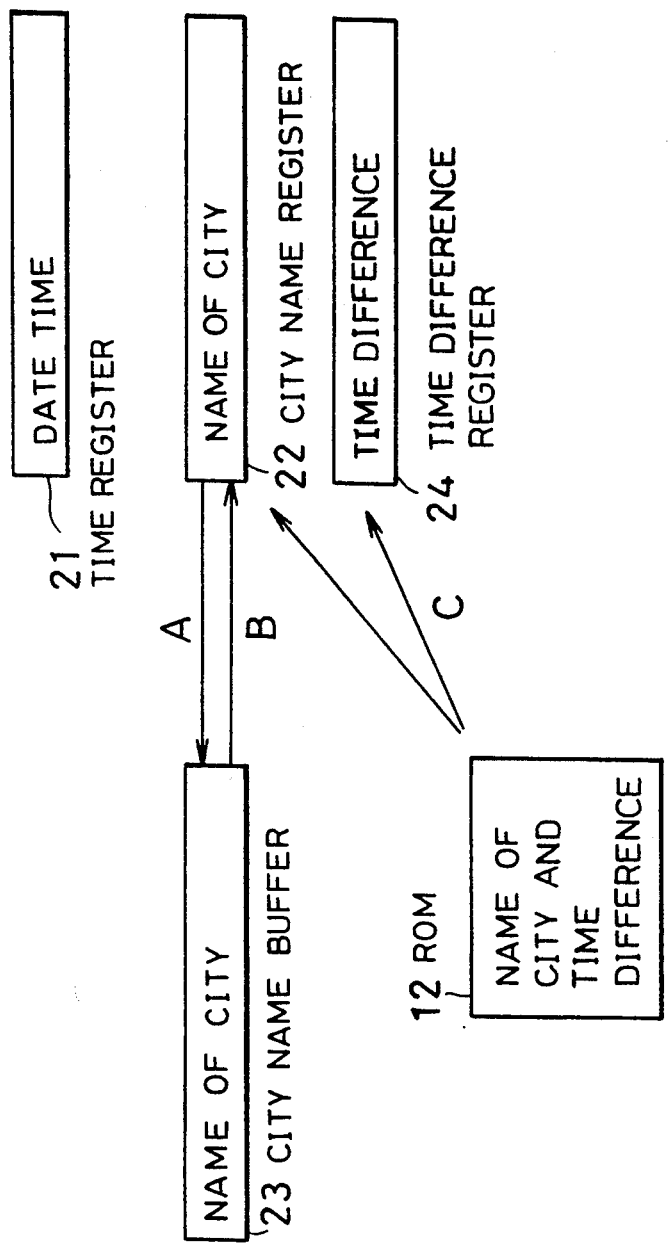
FIG. 3 is a block diagram showing a memory configuration the electronic memorandum device.

Referring to FIG. 3, a memory configuration of the electronic memorandum device comprises a time register 21 for a clock clocking the current time, a city name register 22 for storing city names, a city name buffer 23 for editing the city names, and a time difference register 24 for storing time differences read out from the ROM. In the RAM 13 are provided the time register 21, city name register 22, city name buffer 23 and the time difference register 24. In the ROM 12 are prestored time differences and city names. More specifically, the names of various cities in the world and the time differences between the current time and the respective cities are prestored in the ROM 12. It should be noted that the characters A, B and C in FIG. 3 mean data transfer from the city name register 22 to the city name buffer 23, from the city name buffer 23 to the city name register 22, and from the ROM 12 to either of the city name register 22 and the time difference register 24, respectively.

An operator uses the key input 3 to specify a time difference or enter a city name not prestored in the ROM 12. Upon specification of the time difference, the CPU 11 reads out from the ROM 12 a city name in the clocking or time zone corresponding to that time difference in that zone and a standard time calculated on the basis of the time difference and stores them in the city name register 22 and the time difference register 24, respectively. On the other hand, upon entry of the city name that is not prestored in the ROM 12, the CPU 11 stores the city name in the city name buffer 23 and replaces the city name in the city name register 22 with the city name stored in the city name buffer 23. The display 2 displays the city name being stored in the city name register 22 together with the standard time being stored in the time difference register 24.

Figure 4:
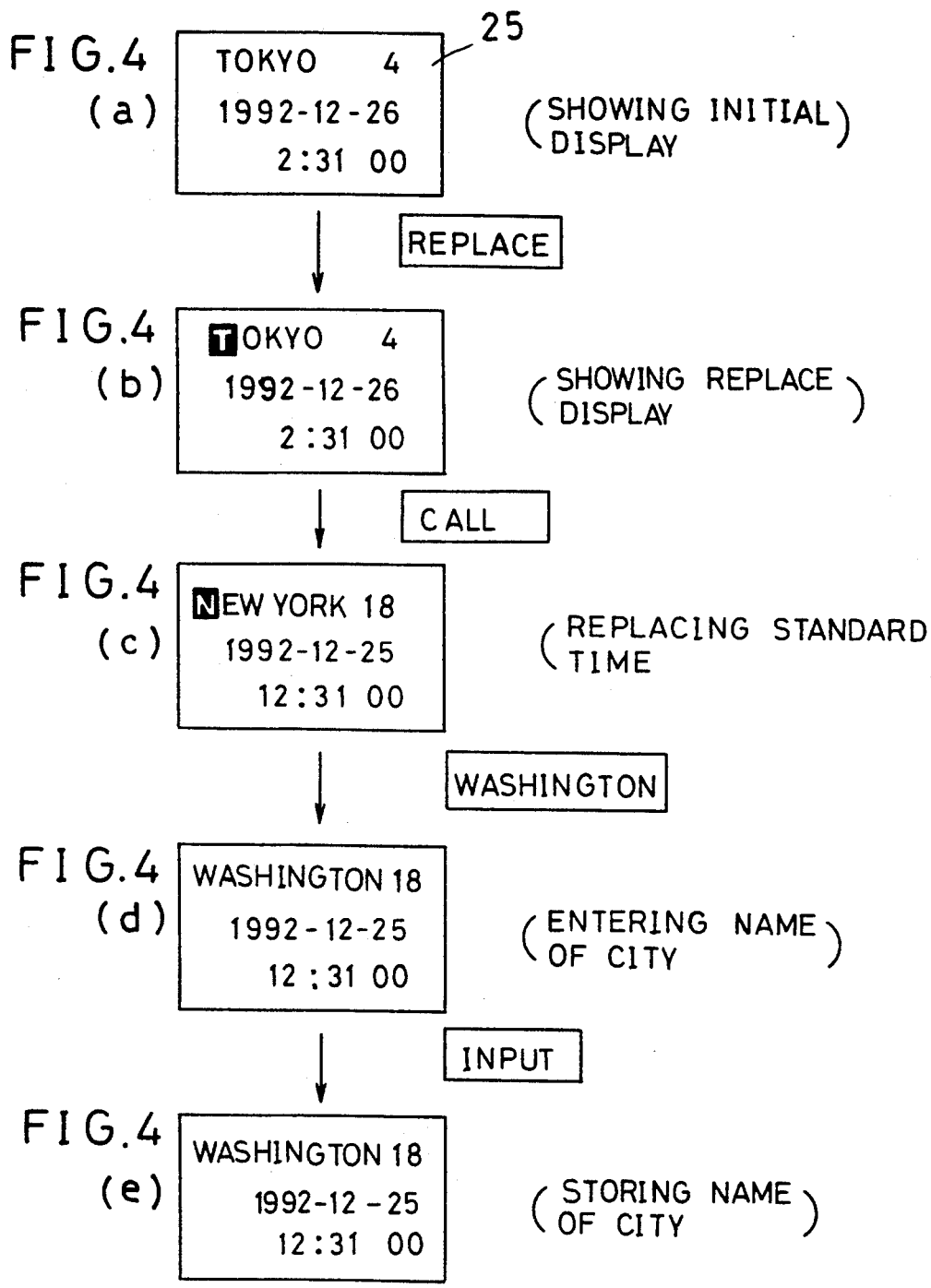
FIGS. 4(a)-4(e) are a schematic representation showing an example of display in the display part of the electronic memorandum device.

Referring to FIGS 4(a-4(e), an initial display (FIG. 4(a)) is first illustrated. Pressing a replace key 3b causes a shift into a replace mode, and the display changes to a replace display (FIG. 4(b)). Pressing a calling key 3d causes the standard time being displayed for, e.g., Tokyo to be replaced with the standard time for, e.g., New York (FIG. 4(c)) and the city name being displayed or New York to be replaced with Washington (FIG. 4(d)). After the replacement of city name, pressing an input key 3c causes the replacing city name to be stored (FIG. 4(e)). Thus, the replacing city name and the standard time therefor are henceforth displayed in the initial display. The character in a reverse display or designated by a cursor can be replaced with another one by entry, and that the numeral indicated at 25 is a code representing a time difference.

Figure 5:
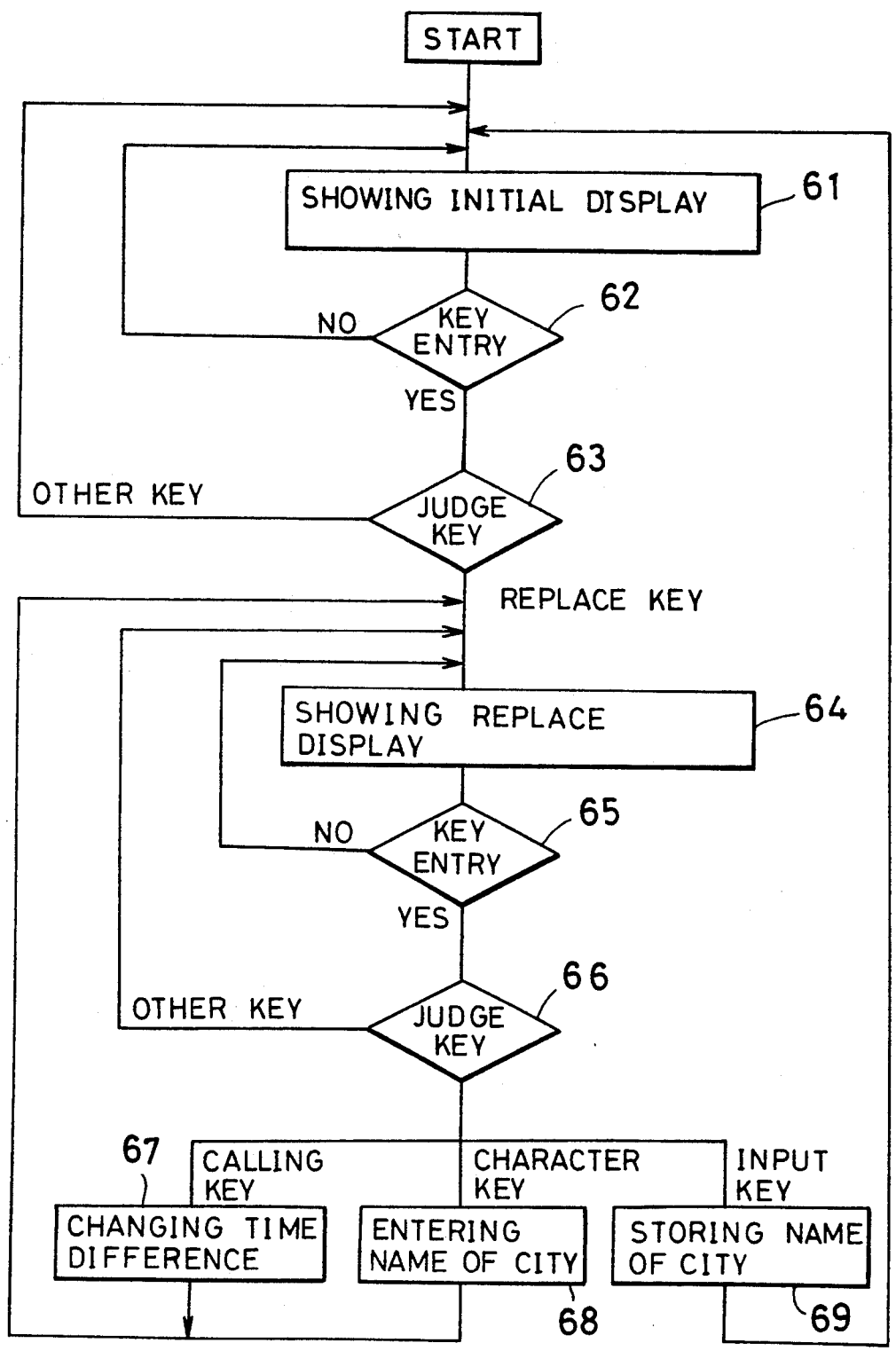
FIG. 5 is a flow chart showing an operation of the embodiment.

Finally, the operation of the CPU 11 is described referring to FIG. 5. First, the CPU 11 causes the initial display to be displayed for world times clocking (Step 61). If a key entry is carried out (Step 62), the CPU judges with which key the entry is caused (Step 63). If the key is the replace key, the mode comes into the replace mode and the display is changed over to the replace display (Step 64). Then, a city name is transferred from the city name register 22 to the city name buffer 23. If there is a subsequent key entry (Step 65), the CPU 11 judges with which the key entry is caused (Step 66). If the key is the calling key, the time difference is changed (Step 67). Upon change of time difference, the standard time corresponding to the replacing time difference and a city belonging to the clocking zone using that standard time are read out from the ROM 12 and transferred to the city name register 22 and the time difference register 24, respectively.

In Step 66, if the key entry is caused by the character key, a city name is stored in the city name buffer 23 (Step 68), while on the other hand if the key entry is caused by the input key, the city name in the city name buffer 23 is transferred to be stored in the city name register 22 (Step 69). Henceforth, the replacing city name together with the standard time therefor is displayed in the initial display.

According to the present invention a city name that is called can be replaced with any desired city name. Consequently, if the name of a city is replaced with that of any city belonging to the same clocking zone, it is possible to see standard times for other zones on the basis of the standard time for the city of the replacing name.

What is claimed is:

1. A data processor with clocking for plural world times comprising:

clocking means for clocking a reference time for a predetermined city in the world;

prestorage means for prestoring names of various cities in the world and a corresponding time difference between the reference time clocked by said clocking means and a standard time for each of said various cities;

means for specifying a time difference and for entering a name of a city other than said names of various cities prestored in said prestorage means;

readout means, upon specification of the time difference, for calculating a standard time on the basis of the time difference and for reading out the calculated standard time and a prestored name of the city corresponding with said time difference;

city name storage means for storing the read-out name of a city;

time storage means for storing the calculated standard time which is read out;

replacing means, upon entry of the name of a city other than the names of various cities prestored in said prestorage means through said input means, for replacing the read-out name of a city in said city name storage means with the name of a city entered through said input means; and display means for displaying the replacing city name and the calculated standard time stored in said time storage means.

2. A data processor as set forth in claim 1, wherein the entry of the name of a city is carried out by displaying one of the prestored names of various cities, indicating with a cursor that the displayed name of city is to be replaced, and replacing the cursor-indicated name with the name of a city entered through said input means.

3. A data processor as set forth in claim 1, wherein said display means simultaneously displays the name of a city in the world, a code representing a time difference between the standard time for the city of that name and the standard time clocked by the clocking means, and the data and standard time for the city of that name.

4. A data processor as set forth in claim 1, wherein said prestorage means is composed of a read only memory.

5. An apparatus for monitoring current times in various time zones throughout the world comprising:
a processor;
a clock connected to the processor for generating a reference time;
a first memory connected to the processor for storing a first set of city names in various time zones along with corresponding time differences between the standard times in those cities and the reference time;
a display connected to the processor for displaying a city name from the first set of city name with its corresponding time difference and current standard time; and
an input device connected to the processor for inputting a city name other than the first set of city names stored in the first memory and a corresponding time difference between the reference time and a current time in a time zone in which the input city is located;
wherein the processor analyzes a time difference input by the input device, retrieves a city name from the first memory whose corresponding time difference matches the input time difference, replaces the retrieved city name with the input city name other than the first set of city names, and displays the input city and corresponding current time.

6. The apparatus according to claim 5, further comprising:
a second memory storing the retrieved city name and the replacing city name.

7. The apparatus according to claim 5, wherein time differences are assigned codes which are displayed to indicate the time zone of the displayed city.

8. A data processor as set forth in claim 5, wherein a city name is entered by displaying one of the first set of city names, indicating with a cursor replacement of the displayed city, name and replacing the indicated city name with a city name input by the input device.

9. A data processor as set forth in claim 5, wherein the display simultaneously displays any city name in the world, a code representing a time difference between the standard time in the displayed city and the reference time, the date, and the current standard time for the displayed city.

10. A method for monitoring times in cities throughout the world in an electronic memorandum device, comprising:
(a) storing a first set of city names and corresponding time zone differences from a reference time zone;
(b) initially displaying a city name from the first set of cities and a current time in the time zone for the displayed city name based on the corresponding time difference;
(c) inputting a new time zone;
(d) displaying another city name from the first set of cities belonging to the new time zone and a corresponding current time in the new time zone;
(e) inputting a name of a city other than the first set of city names which is located in the new time zone; and
(f) replacing the another city name displayed in step (d) with the city name input in step (e).

* * * * *